(12) United States Patent
Kwan et al.

(10) Patent No.: US 7,163,575 B2
(45) Date of Patent: Jan. 16, 2007

(54) WATER-BASED, RESIN-FREE AND SOLVENT-FREE ERADICABLE BALL-PEN INKS

(75) Inventors: Wing Sum Vincent Kwan, Chicago, IL (US); David Allen Godbout, East Lyme, CT (US)

(73) Assignee: Sanford, L.P., Freeport, IL (US)

( * ) Notice: Subject to any disclaimer, the term of this patent is extended or adjusted under 35 U.S.C. 154(b) by 0 days.

(21) Appl. No.: 10/891,810

(22) Filed: Jul. 15, 2004

(65) Prior Publication Data

US 2006/0032398 A1 Feb. 16, 2006

(51) Int. Cl.
*C09D 11/00* (2006.01)

(52) U.S. Cl. .................. 106/31.32; 106/31.58
(58) Field of Classification Search ............. 106/31.32, 106/31.58
See application file for complete search history.

(56) References Cited

U.S. PATENT DOCUMENTS

| | | | |
|---|---|---|---|
| 2,029,152 A | 1/1936 | Bonkowski | |
| 3,875,105 A | 4/1975 | Daugherty et al. | |
| 3,941,488 A | 3/1976 | Maxwell | |
| 3,945,837 A * | 3/1976 | Miyata et al. | 106/31.43 |
| 3,985,455 A | 10/1976 | Wahlberg | |
| 4,148,591 A | 4/1979 | Tomura | |
| 4,156,657 A | 5/1979 | Lin | |
| 4,213,717 A * | 7/1980 | Lin | 401/18 |
| 4,227,930 A | 10/1980 | Lin | |
| 4,228,028 A | 10/1980 | Lin | |
| 4,252,845 A | 2/1981 | Griffiths et al. | |
| 4,349,639 A | 9/1982 | Muller | |
| 4,413,266 A | 11/1983 | Aviram et al. | |
| 4,441,928 A | 4/1984 | Iijima | |
| 4,509,875 A | 4/1985 | Shintani | |
| 4,557,618 A | 12/1985 | Iwata et al. | |
| 4,580,918 A | 4/1986 | Baker et al. | |
| 4,738,725 A | 4/1988 | Daugherty et al. | |
| 4,777,510 A | 10/1988 | Russel | |
| 4,808,227 A | 2/1989 | Yuasa et al. | |
| 4,865,479 A | 9/1989 | Doll | |
| 4,971,628 A * | 11/1990 | Loftin | 524/43 |
| 5,006,171 A | 4/1991 | Mecke et al. | |
| 5,026,189 A | 6/1991 | Keil | |
| 5,033,895 A | 7/1991 | Aida | |
| 5,048,992 A | 9/1991 | Loftin | |
| 5,139,572 A | 8/1992 | Kawashima | |
| 5,215,956 A | 6/1993 | Kawashima | |
| 5,232,494 A | 8/1993 | Miller | |
| 5,256,191 A | 10/1993 | Thompson et al. | |
| 5,326,288 A | 7/1994 | Lu et al. | |
| 5,326,388 A | 7/1994 | Miller et al. | |
| 5,338,123 A | 8/1994 | Obersteller et al. | |
| 5,370,471 A | 12/1994 | Kageyama et al. | |
| 5,378,752 A | 1/1995 | White et al. | |
| 5,417,748 A | 5/1995 | Kawashima | |
| 5,460,647 A | 10/1995 | Snedeker et al. | |
| 5,464,470 A | 11/1995 | Brachman et al. | |
| 5,466,281 A * | 11/1995 | Hanke et al. | 106/31.38 |
| 5,478,382 A | 12/1995 | Miller et al. | |
| 5,486,228 A | 1/1996 | Miller et al. | |
| 5,489,331 A | 2/1996 | Miller et al. | |
| 5,492,558 A | 2/1996 | Miller et al. | |
| 5,498,282 A | 3/1996 | Miller et al. | |
| 5,498,285 A | 3/1996 | Hooykaas | |
| 5,499,881 A | 3/1996 | Chang | |
| 5,509,742 A | 4/1996 | Balzarini | |
| 5,549,742 A | 8/1996 | Cancellieri | |
| 5,593,459 A | 1/1997 | Gamblin | |
| 5,649,999 A | 7/1997 | Wang | |
| 5,762,077 A | 6/1998 | Griffiths, Jr. | |
| 5,785,746 A | 7/1998 | Kito et al. | |
| 5,872,162 A | 2/1999 | McHugh et al. | |
| 5,877,234 A | 3/1999 | Xu et al. | |
| 5,916,357 A * | 6/1999 | Wang et al. | 106/31.23 |
| 5,964,931 A | 10/1999 | Korper | |
| 5,977,211 A | 11/1999 | Koyama | |
| 5,997,891 A | 12/1999 | Fuerst et al. | |
| 6,037,391 A | 3/2000 | Iida | |
| 6,048,914 A | 4/2000 | Goto et al. | |
| 6,051,629 A | 4/2000 | Ichikawa et al. | |
| 6,124,377 A | 9/2000 | Kaiser et al. | |
| 6,149,721 A | 11/2000 | Wang et al. | 106/31.32 |
| 6,179,501 B1 | 1/2001 | Fulop | |

(Continued)

FOREIGN PATENT DOCUMENTS

DE 27 24 820 A1 12/1978

(Continued)

OTHER PUBLICATIONS

International Search Report for International PCT Application No. PCT/US2005/024482, dated Oct. 6, 2005.

(Continued)

*Primary Examiner*—David Sample
*Assistant Examiner*—Veronica Faison-Gee
(74) *Attorney, Agent, or Firm*—Marshall, Gerstein & Borun LLP

(57) ABSTRACT

Improved combination eradicable ball-pen and re-write inks are disclosed. The combination eradicable and re-write ball-pen inks disclosed include water, glycerol, one or more acids and an eradicable dye. Glycerol is present in an amount greater than the water content, which is relatively low and the eradicable dye is provided in substantial amounts so that the glycerol and eradicable dye provide the requisite viscosity for a ball-pen ink. The combination of the high dye content and acid content also enables the eradicable ball-pen ink to be used as the re-write ink.

42 Claims, No Drawings

U.S. PATENT DOCUMENTS

| | | |
|---|---|---|
| 6,203,603 B1 | 3/2001 | Takayama et al. |
| 6,214,766 B1 | 4/2001 | Kurrle |
| 6,221,432 B1 | 4/2001 | Wang et al. |
| 6,228,804 B1 | 5/2001 | Nakashima |
| 6,261,352 B1 | 7/2001 | Asami |
| 6,276,853 B1 | 8/2001 | Breidenbach et al. |
| 6,306,930 B1 | 10/2001 | Tsujio |
| 6,357,943 B1 | 3/2002 | Kuang |
| 6,406,204 B1 | 6/2002 | Omatsu et al. |
| 6,410,338 B1 | 6/2002 | Lippold et al. |
| 6,412,998 B1 | 7/2002 | Ham |
| 6,489,892 B1 | 12/2002 | Lawandy |
| 6,491,464 B1 | 12/2002 | Young |
| 6,518,356 B1 | 2/2003 | Friese et al. |
| 6,554,516 B1 | 4/2003 | Christopher |
| 6,613,135 B1 | 9/2003 | Miyamoto et al. |
| 6,905,539 B1 | 6/2005 | Patel et al. |
| 2001/0006610 A1 | 7/2001 | Miller et al. |
| 2002/0058296 A1 | 5/2002 | Miller et al. |
| 2002/0151084 A1 | 10/2002 | Lippold et al. |
| 2003/0082823 A1 | 5/2003 | Sumitani et al. |
| 2005/0011404 A1* | 1/2005 | Patel et al. .............. 106/31.27 |

FOREIGN PATENT DOCUMENTS

| | | |
|---|---|---|
| DE | 199 03 248 | 8/2000 |
| EP | 0 032 653 | 7/1981 |
| EP | 0 049 777 | 4/1982 |
| GB | 1091474 | 11/1967 |
| JP | 54-16235 | 6/1979 |
| JP | 60 190479 | 9/1985 |
| JP | 60-49397 | 2/1994 |
| JP | 2001-158196 | 6/2001 |
| JP | 2001-247807 | 9/2001 |
| JP | 2003-73602 | 12/2003 |

OTHER PUBLICATIONS

Written Opinion of the International Searching Authority for International PCT Application No. PCT/US2005/024482, dated Oct. 6, 2005.

International Search Report for International (PCT) Patent Application No. PCT/US2005/030843, dated Feb. 7, 2006.

Written Opinion of the International Searching Authority for International (PCT) Patent Application No. PCT/US2005/030843 dated Feb. 7, 2006.

* cited by examiner

WATER-BASED, RESIN-FREE AND SOLVENT-FREE ERADICABLE BALL-PEN INKS

TECHNICAL FIELD

A series of improved eradicable ball-pen inks are disclosed. Some of the disclosed eradicable ball-pen inks can be used as an initially applied ink that can be eradicated with an eradicating fluid and further that can also be used as the re-write ink which eliminates the need for a third fluid for use as the re-write ink.

BACKGROUND OF THE RELATED ART

Correction fluids for correcting errors on typewritten and handwritten materials are known in the art. Typically, such correction fluids are opaque material, often white in color but various tinted formulations are available for use on non-white paper. Currently available correction fluids provide an opaque coating over the error and provide a surface for writing or printing the correction. One problem associated with currently available correction fluids is that the color of the correction fluid rarely matches the color of the paper exactly, thereby further drawing attention to the corrected mistake and diminishing the appearance of the finished written product. Further, use of correction fluids changes the texture of the paper and can draw the readers attention to the corrected mistake. Also, if the user begins to write or print over the correction fluid before it is sufficiently dried, the smoothness of the correction fluid surface will be destroyed thereby making the correction sloppy and unprofessional looking.

To eliminate these problems associated with the use of conventional correction fluids, ink eradicators have been developed. An ink eradicator is a liquid material that reacts with the dye of an eradicable ink to change the color of the dye in the eradicable ink from a colored state to a clear or colorless state. In other words, an eradicating fluid can "erase" the inked error.

Typical eradicator fluids are near Newtonian, water-based fluids and are applied by way of a porous tip in fluid communication with a reservoir containing the eradicator fluid. Typically, eradicator fluids are provided in felt tip marker type instruments and the user rubs the felt tip against the incorrect written material until the incorrect written material disappears on the page. Then, after waiting a sufficient amount of time for the eradicator fluid to dry, the user can make the correction with a re-write ink.

Typically, the re-write ink is different than the original eradicable ink because it is resistant to chemical reaction with the dried eradicator fluid. Specifically, the re-write ink does not contain a dye that has the ability to be decolorized by the eradicator or eradicating fluid.

Thus, in current systems utilizing an eradicating fluid as opposed to a correction fluid, three different materials are required: the eradicable ink, the eradicating fluid and the re-write ink. As a result, three different writing instruments may be required: one for the eradicating fluid, one for the eradicable ink and one for the re-write ink. In current systems, it is very easy for the consumer to confuse the eradicable ink, which should be used for the original marking, and the re-write ink, which must be used for the correction because it will not react with the dried eradicating fluid.

To simplify the use of eradicating fluids and eradicable inks, there is a need for an improved eradicable ball-pen ink system which permits the eradicable ball-pen ink to also be used for making the corrections.

In addressing this problem, most ball-pen inks are organic non-polar solvent based. However, most eradicable dyes are not soluble in organic solvents. To make eradicable dyes soluble in non-polar organic solvents, U.S. Pat. No. 6,221,432, commonly assigned with this application, teaches the use of various salts for use as counter ions to provide a hydrophobic property to the eradicable dye thereby rendering it soluble in such non-polar organic solvents. However, this requires additional process steps thereby adding to the cost of such an eradicable ball-pen ink system.

Accordingly, because eradicable ball-pen dyes are typically hydrophilic, a water-based system would be preferable, or a system that does not depend upon the use of non-polar polar organic solvents. Therefore, there is a need for an improved water-based ball-pen ink that is eradicable and can also be used as a re-write ink.

SUMMARY OF THE DISCLOSURE

In satisfaction of the aforenoted needs, a plurality of water-based, non-polar organic solvent-free ball-pen inks that may be also be used as re-write inks.

In an embodiment, an improved eradicable ball-pen ink comprises water, one or more polyols, one or more acids, an eradicable dye and the ink is free of non-polar organic solvents and has a ratio of polyol to water that is greater than 1. Polyols, at room temperature, are not considered to be an organic solvent due to their high melting and boiling points and polarities.

In a refinement, the one of more polyols are selected from the group consisting of glycerol, one or more glycols, one or more glymes or glycol diethers, glycol ethers, glycol acetates and mixtures thereof.

Preferably, the polyol is glycerol with or without one or more glycols.

In a refinement, the disclosed ink is also free of resins as viscosity required for a ball-pen ink is provided by the glycerol content and the high content of the eradicable dye. While polymer coating additives such as poly vinyl pyrollidone (PVP) may be used, these types of additives are not considered to be resins.

In another refinement, the eradicable dye is present in an amount greater than 20 wt %.

In yet another refinement, one or more glycols may be added with glycerol. It has been found that-glycols in combination with a non-resinous thickener, such as a gum (e.g., xanthan gum) enhance the performance characteristics of the ball-pen ink and help to prevent leakage of the ink through a ball-pen tip when the pen is not in use.

In another refinement, the ratio of polyol to water is greater than 2:1 In another refinement, the eradicable dye is selected from the group consisting of Auramine O, Basic Yellow 2, Basic Yellow 11, Basic Yellow 13, Basic Yellow 21, Basic Yellow 28, Basic Yellow 29, Basic Yellow 40, Basic Yellow 49, Acid Blue 22, Acid Blue 83, Acid Blue 93, Acid Fuchsin, Acid Green 3, Acid Green 5, Acid Green 9, Acid Magenta, Acid Roseine, Acid Rubin, Acid Violet 17, Acid Violet 19, Acid Violet 49, Alizarol Cyanin R, Aluminon, Aniline Blue Ws, Basic Blue 8, Basic Blue 15, Basic Blue 20, Basic Blue 26, Basic Fuchsin, Basic Green 4, Basic Red 9, Basic Red 14, Basic Red 15, Basic Red 29, Basic Red 46, Basic Violet 2, Basic Violet 3, Basic Violet 4, Basic Violet 14, Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta Ii, Magenta Iii, Malachite Green, Methyl Blue, Methyl Green, Methyl Violet, Methyl Violet 2b, Methyl Violet 10b, Mordant Blue 3, Mordant Violet 39, New Fuchsin, Night Blue, Acid Orange 10, Acid Orange 21, Pararosanilin, Primula, Rosanilin, Solochrome Cyanin R, Victoria Blue 4r, Victoria Blue B, Victoria Green B, Water Blue I, and combinations thereof.

In another refinement, the acid is present in an amount less than 20 wt %.

In a further refinement of this concept, the acid is selected from the group consisting of citric acid, phosphoric acid, benzoic acid, lactic acid, acetic acid, propanoic acid, acetoacetic acid, crotonic acid, formic acid, glycerlic acid, glycollic acid, glyoxylic acid, lactic acid, pyruvic acid, trans-aconitic acid, fumaric acid, maleic acid, malic acid, tartaric acid, acetylenedicarboxylic acid, tetrahydrophthalic acid, mesaconic acid, phthalic acid, isophthalic acid, terephthalic acid, itaconic acid, trans-ethyleneoxidedicarboxylic acid, succinic acid, adipic acid, pimellic acid, suberic acid, azelic acid, substituted phosphoric acid, citric acid, hemimellitic acid, trimellitic, trimesic acid, 2-carboxyethyliminodiacetic acid, nitrilotriacetic acid, phosphonic acid, mellophanic acid, prehnitic acid, pyromellitic acid, 2-phosphonoethyliminodiacetic acid, diethylenetetraacetic acid, hydrochloric acid, hydrobromic acid, hydroiodic acid, hydrofluoric acid, nitric acid, sulfuric acid, carbonic acid, chromic acid, phosphorous acid, phosphonic acid and combinations thereof.

In another refinement, the disclosed ink is free of resins. The disclosed ink can be free of resins or substantial amounts of thickeners due to the high polyol content and high eradicable dye content. For example, glycerol, in addition to providing the high viscosity required for suitable ball-pen ink, also provides a carrier for the high amounts of eradicable dyes present in the formulation.

In another refinement, the disclosed inks have a pH of less than 3 thereby enabling the disclosed eradicable bell-pen inks to also be used as re-write inks.

Further, in an improved combination eradicable and re-write ink in a viscosity suitable for use in ball-point pens is disclosed which comprises an acid in the form of citric acid, a low water content, an eradicable dye and an acid that helps to increase the viscosity and limit or eliminate the need for a resin to increase the viscosity.

In a refinement, the eradicable dye of the combination eradicable and re-write ball-pen ink described above is selected from the group consisting of acid blue 93, basic green 4, acid violet 19, basic red 14 and mixtures thereof. Other eradicable dyes are available, some of which are listed below.

In a further refinement, the combination eradicable and re-write ball-pen ink has a pH of less than 3.

As the disclosed inks are used for a ball pen, the viscosity ranges from about 1 to about 6 Kcp and has a pH ranging from about 2 to about 3 as well. The moderate pH ink will avoid corrosion of ball point pen tips and porous tips as described above.

Additionally, the eradicable inks and eradicators disclosed herein have applications to other technologies where a color changing liquid is needed.

DETAILED DESCRIPTION OF THE PRESENTLY PREFERRED EMBODIMENTS

A typical formulation for an eradicable ink includes a solvent (e.g., water) to dissolve a dye that is capable of being eradicated (e.g., a triarylmethane dye). The eradication solution includes an eradicator that, by a chemical process, converts an otherwise colored dye into a substantially colorless compound or a color that matches that of the substrate (e.g., white for white paper). Such compounds include oxidizing agents, reducing agents, acid-base reactants, and chemicals that can sublime under the influence of heat. Without intending to be limited to any particular method of eradication, it is believed that for triarylmethane dyes, the active colored dye is able to reflect color in the visible range (between 380 nm to 780 nm) because of the conjugation of the aromatic rings in the molecule; however, once an oxidizing agent is applied to the triarylmethane dye, it destroys the conjugation and the dye becomes at least substantially colorless. This proposed process is shown below for Acid Violet 17:

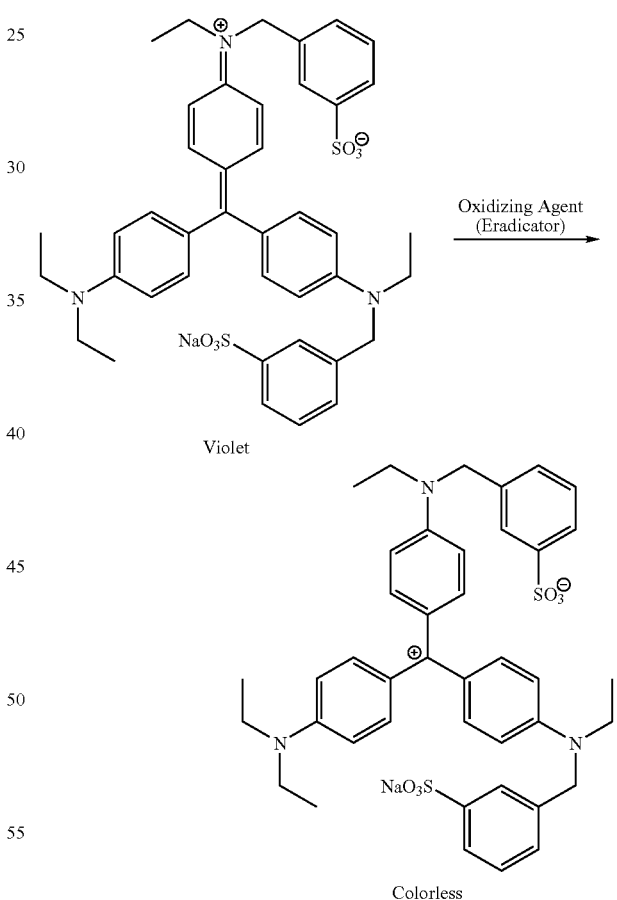

The eradication solution preferably includes water or an organic solvent as the primary solvent, an eradicator such as, for example, a sulfite, bisulfite, or an amine (e.g., sodium glycinate) that can cause certain dyes to lose their colors (e.g., triarylmethane dyes) or to change color, and a film-forming polymer. A suitable eradicator solution for the inks disclosed herein is a commercially available eradicator solution that includes both a sulfite and an amine as active eradicating agents (e.g., oxidizers) (available from Sanford Reynolds of Valence, France). See also the eradicating fluids disclosed in commonly assigned U.S. patent application Ser. No. 10/619,706, now U.S. Pat. No. 6,905,539.

The eradicable nature of the ink is derived from the ability to convert the dye (chromophore) from a colored compound to at least substantially colorless, or alternatively, to another color (e.g., the color of the paper used). As discussed above, this can be achieved with the combination of a dye that is sensitive to oxidation and an oxidizing agent. Dyes which are capable of performing this change in color include diarylmethane derivative dyes, triarylmethane derivative dyes, and methine derivative dyes. Diaryl dyes for use with the inks disclosed herein include Auramine O (Chemical Index No. 41000), and Basic Yellow 2 (Chemical Index No. 41000). In the colored state, the bi- and triarylmethane, and methine dyes often contain one or more cationic imine groups. The generic structure of a triarylmethane dye is shown below in formula (II):

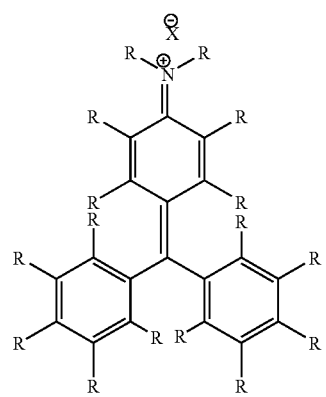

(II)

wherein each R group is the same or different and preferably is selected from $C_1$ to $C_{10}$ alkyl groups. A non-exhaustive list of triarylmethane dyes for use in inks disclosed herein are listed below in Table I.

TABLE I[1]

| Color Index Name | Color Index No. | Common/Commercial Name |
| --- | --- | --- |
| Acid Blue 22 | 42755 | Water Blue I |
| Acid Blue 93 | 42780 | Methyl Blue |
| Acid Fuchsin | 42685 | Acid Fuchsin |
| Acid Green 3 | 42095 | Light Green Sf Yellowish |
| Acid Green 5 | 42095 | Light Green Sf Yellowish |
| Acid Magenta | 42685 | Acid Fuchsin |
| Acid Roseine | 42685 | Acid Fuchsin |
| Acid Rubin | 42685 | Acid Fuchsin |
| Acid Violet 17 | 42650 | Acid Violet 4BN |
| Acid Violet 19 | 42685 | Acid Fuchsin |
| Alizarol Cyanin R | 43820 | Eriochrome Cyanin R |
| Aluminon | 43810 | Triphenylmethane Chrome Violet Cg |
| Aniline Blue Ws | | Aniline Blue Ws |
| Basic Blue 8 | 42563 | Victoria Blue 4r |
| Basic Blue 15 | 44085 | Night Blue |
| Basic Blue 20 | 42585 | Methyl Green |
| Basic Blue 26 | 44045 | Victoria Blue B |
| Basic Fuchsin | | Basic Fuchsin |
| Basic Green 4 | 42000 | Malachite Green |
| Basic Red 9 | 42500 | Pararosanilin |
| Basic Red 14 | 48016 | Cationic Brilliant Red 5GN |
| Basic Violet 2 | 42520 | New Fuchsin |
| Basic Violet 3 | 42555 | Crystal Violet |

TABLE I[1]-continued

| Color Index Name | Color Index No. | Common/Commercial Name |
| --- | --- | --- |
| Basic Violet 4 | 42600 | Ethyl Violet |
| Basic Violet 14 | 42510 | Rosanilin |
| Chrome Violet Cg | 43810 | Triphenylmethane Chrome Violet Cg |
| Chromoxane Cyanin R | 4382 | Eriochrome Cyanin R |
| Cotton Blue | 42780 | Methyl Blue |
| Crystal Violet | 42555 | Crystal Violet |
| Dahlia | 42530 | Hoffman's Violet |
| Diamond Green B | 42000 | Malachite Green |
| Eriochrome Cyanin R | 43820 | Eriochrome Cyanin R |
| Ethyl Green | 42590 | Ethyl Green |
| Ethyl Violet | 42600 | Ethyl Violet |
| Fast Green Fcf | 42053 | Fast Green Fcf |
| Food 3 | 42053 | Fast Green Fcf |
| Gentian Violet | | Methyl Violet 2b |
| Helvetia Blue | 42780 | Methyl Blue |
| Hoffman's Violet | 42530 | Hoffman's Violet |
| Light Green | 42095 | Light Green Sf Yellowish |
| Lissamine Green Sf | 42095 | Light Green Sf Yellowish |
| Magenta 0 | 42500 | Pararosanilin |
| Magenta I | 42510 | Rosanilin |
| Magenta Ii | | Magenta Ii |
| Magenta Iii | 42520 | New Fuchsin |
| Malachite Green | 42000 | Malachite Green |
| Methyl Blue | 42780 | Methyl Blue |
| Methyl Green | 42585 | Methyl Green |
| Methyl Violet | 42535 | Methyl Violet 2b |
| Methyl Violet 2b | 42535 | Methyl Violet 2b |
| Methyl Violet 10b | 42555 | Crystal Violet |
| Mordant Blue 3 | 43820 | Eriochrome Cyanin R |
| Mordant Violet 39 | 43810 | Triphenylmethane Chrome Violet Cg |
| New Fuchsin | 4252 | New Fuchsin |
| Night Blue | 44085 | Night Blue |
| Pararosanilin | 42500 | Pararosanilin |
| Primula | 42530 | Hoffman's Violet |
| Rosanilin | 42510 | Rosanilin |
| Solochrome Cyanin R | 43820 | Eriochrome Cyanin R |
| Victoria Blue 4r | 42563 | Victoria Blue 4r |
| Victoria Blue B | 44045 | Victoria Blue B |
| Victoria Green B | 42000 | Malachite Green |
| Water Blue I | 42755 | Water Blue I |

[1]See, R. D. Lillie, Conn's Biological Stains (8th ed., 1969), Williams and Wilkins Company, Baltimore, Maryland; Susan Budavari (Ed.), The Merck Index, (12th ed., 1996), Merck & Co., Whitehouse Station, N. J; see also, P. A. Lewis (Ed.) PigmentHandbook Vol. I, Properties and Economics, sections I(D)f(1) and I(D)g, John Wiley & Sons, (2$^{nd}$ ed., 1988); H. Zollinger, Color Chemistry: Syntheses, Properties, and Applications of Organic Dyes And Pigments, Chapter 4, VCH Publishers (1987); D. R. Warringand G. Hallas (Eds.) The Chemistry and Application of Dyes, Chapter 2, Section IX, Plenum Press (1990); and M. Okawara, T. Kitao, T. Hirashima, and M. Matsuoka, Organic Colorants: A Handbook of Data of Selected Dyes for Electro-Optical Applications, Section VI, Elsevier (1988.)

Another type of dye that can be used in an ink are the methine class of dyes. The methine dyes generally relate to dyes that contain a chromophore that consists of one or more of a methine group (—CH═C—), also called methylidyne or methine group. When the methine dye only contains one methine group the dye is sometimes referred to as a cyanine dye, with three methine groups the dye is sometime referred to as a carbocyanine dye, and with more than three methine groups the dye is often referred to as a polymethine dye. An example of a methine dye is Thiazole Orange, shown below:

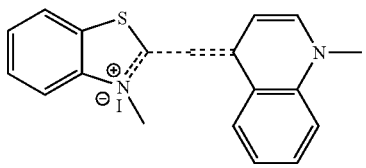

wherein the bonds that make up the methine groups are shown above as dashed lines. Other examples of methine dyes include Basic Red 15, Basic Yellow 11, and Basic Yellow 13. For a comprehensive listing of methine dyes, see F. M. Hamer, The Chemistry of Heterocyclic Compounds, A. Weissberger (Ed.), The Cyanine Dyes and Related Compounds, Wiley Interscience, New York (1964).

In spectroscopic terms, the color white is represented as having the property of reflecting light at of substantially all visible wavelengths without a substantial loss. If one considers the color white as a theoretical spectral starting point, once a wavelength of visible light is absorbed by the white material, that material is colored. For example, if a material is white and is made to absorb visible light at 470 nm, then that material would appear blue instead of white. Likewise, the color black, in spectroscopic terms, is represented as having the property of absorbing light at of substantially all visible wavelengths without a substantial loss.

When formulating an eradicable ball-pen ink of a particular color, whether by the addition of one dye or a mixture of dyes, the rate of eradication of a dye (once applied to a substrate) is a consideration when selecting a dye. Without intending to be limited to a particular mechanism, it is believed that the rate of eradication of diarylmethane, triarylmethane, and methine dyes is proportional to the concentration of the dye in the ink. The ink described herein includes one or more dyes selected from the group consisting of diarylmethane dyes, triarylmethane dye, methine dyes, and combinations thereof. The dye preferably is present in an amount in a range of about 20% to about 40% by weight of the total weight of the composition, more preferably about 26% to about 32% by weight. The high content of the dye also helps to provide the viscosity needed for a ball-pen ink.

In selecting particular dyes for use in the ink, there are a number of dyes to choose from, and as a result, these dyes of different colors can be mixed to create an ink of almost any color. An eradicable ink disclosed herein can include two or more dyes that, when combined, provide an eradicable ink from a variety of colors. The dyes may be combined to provide a black eradicable ball-pen ink. Two competing considerations when formulating a black eradicable ink are the rate of eradication and the intensity of the black color. An increase in the concentration of the dyes used to create the black color will increase the intensity of the color, however, as discussed above, an increase in the dye concentration also increases the amount of time needed to eradicate the dye. It has been found that for the ball-pen ink disclosed herein the dye concentration in the range of about 20% to about 40% by weight based on the total weight of the composition is a preferred concentration to balance these considerations.

The color of the ink disclosed herein will primarily be determined by the dyes which cause the inks to reflect a particular wavelength of visible light. Mixing two dyes to form an ink of a particular color can be done with the use of two complementary colors, or combinations that contain all three primary colors (red, yellow, and blue). When two complementary colors are mixed, the resultant mixture is gray, with black being the completely saturated form of gray. The complement color of red is green, the complement color of orange is blue, and the complement color of yellow is violet. When using complementary colors, these pairs of complementary colors actually reflect all three primary colors. For example, when red and green dyes are mixed as complementary colors, it is the equivalent of mixing red with yellow and blue, because green is composed of a mixture of the two primary colors yellow and blue. In another example, the mixture of the two complementary colors yellow and violet is the equivalent of mixing yellow with red and blue, because violet is composed of two primary colors, red and blue.

In the inks described herein, the color black can be achieved by the mixing of dyes of either two complementary colors (e.g., green-red, or yellow-magenta) or by dyes with the combination of all three primary colors (red, yellow, and blue). Also, in the inks described herein, a black ink is preferably formed from the combination of a green dye with a dye selected from the group consisting of a red dye, a violet dye, and combinations thereof. One preferred combination of red and green is the combination of Basic Red 14 and Basic Green 4.

When combining two or more colors to form an ink of a desired color, it is understood that the desired color (e.g., black), may be reached even though an undertone of another color (e.g., a bluish-black color) might be perceptible. For example, it is understood that an ink that is colored black can have a red or a blue undertone, and yet still be considered a black ink.

When mixing dyes that are capable of eradication (e.g., di-, triarylmethane and methine dyes) into an ink, it is extremely difficult to prepare a black eradicable ink. Quite surprisingly, it has been found that the combination of a green eradicable dye and a violet and/or a red dye is able to mix to form a black eradicable ink. One embodiment of an ink disclosed herein is a black eradicable ink, including a mixture of two or more dyes selected from the group consisting of diarylmethane derivatives, triarylmethane derivatives, methine dyes, and combinations thereof, wherein the mixture of dyes appears black in color.

The black eradicable inks described herein are considered black even though they may have a red or blue undertone. Control of undertone of the black color can be achieved by altering the weight ratio of the red and green dyes used to mix to form the black color, for example. An increase in the red dye concentration will lead to a red undertone to the black ink, and an increase in the concentration of the green dye (a mixture of the two primary colors yellow and blue) will lead to a blue undertone. When a black ink is formed from the combination of a red dye and a green dye, the preferred weight ratio of the red dye to the green dye is in the range of about 10:1 about 1:10, more preferably about 4:1 to about 1:4. When a black ink is formed from the combination of a violet dye and a green dye, the preferred weight ratio of the violet dye to the green dye is in the range of about 10:1 about 1:10, more preferably about 4:1 to about 1:4.

A black eradicable ink can be formed by the combination of a green dye and a dye selected from the group consisting of red dyes, violet dyes, and combinations thereof. Preferably, the dye-is formed from the combination of a green dye in an amount in a range of about 25% to about 98% by weight with a red dye in an amount in a range of about 2% to about 75% by weight, and/or with a violet dye in an amount in a range of about 2% to about 75% by weight, each based on the total weight of the dye portion of the ink. More preferably, the dye is formed from the combination a green dye in an amount in the range of about 25% to about 98% with a red dye present in an amount in the range of about 1% to about 30%, and/or with a violet dye present in an amount in the range of about 1% to about 30%, each by weight based on the total weight of the dye portion of the ink.

A green dye preferably is selected from the group consisting of Acid Green 3, Acid Green 5, Basic Green 4, Diamond Green B, Ethyl Green, Fast Green Fcf, Food Green 3, Light Green, Lissamine Green Sf, Malachite Green, Methyl Green, Victoria Green B, and combinations thereof. Preferably, a red dye is selected from the group consisting of Basic Red 9, Basic Red 14, Basic Red 15, Basic Red 29, Basic Red 46, and combinations thereof. Preferably, a violet dye is selected from the group consisting of Acid Violet 17, Acid Violet 19, Basic Violet 2, Basic Violet 3, Basic Violet 4, Basic Violet 14, Basic Yellow 49, Chrome Violet Cg, Crystal Violet, Ethyl Violet, Gentian Violet, Hoffman's Violet, Methyl Violet, Methyl Violet 2b, Methyl Violet 10b, Mordant Violet 39, and combinations thereof. To form a yellow ink, a yellow dye is preferably selected from the group consisting of Basic Yellow 11, Basic Yellow 13, Basic Yellow 21, Basic Yellow 28, Basic Yellow 29, Basic Yellow 40, and combinations thereof.

For blue inks, Acid Blue 93 is the preferred eradicable dye. Acid Blue 93 as the following structure:

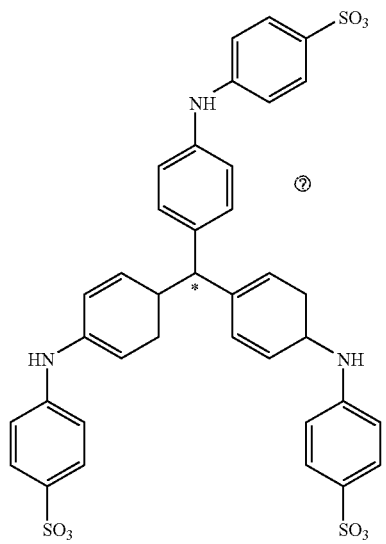

② indicates text missing or illegible when filed

It will be noted that the combination of dyes and eradicating fluids disclosed herein may be useful in applications other than writing instruments where a color change to a liquid is desired such as diagnostic tests or other types of indicators where a visual signal is needed to indicate that a chemical reaction has occurred.

EXAMPLES

With the above concepts in mind, disclosed inks will be described below by the way of the following examples which are not intended to be limiting but are intended for the purposes of illustration.

In Table II below, four exemplary high viscosity, moderate pH ball-pen inks are disclosed. The viscosities for the inks of Examples 1–4 are also sufficiently high so as to enable them to be used in ball-pens as their viscosities exceed 2 Kcp.

TABLE II

|  | Ex. 1 | Ex. 2 | Ex. 3 | Ex. 4 |
|---|---|---|---|---|
| Component |  |  |  |  |
| Water (carrier/solvent) | 15 | 15 | 15 | 15 |
| Glycerol (carrier/solvent) | 39.5 | 39.2 | 47.2 | 36.2 |
| Dow 65 (defoamer) | 0.5 | 0.5 | 0.5 | 0.5 |
| 75% Phosphoric Acid | 0 | 0 | 7 | 3 |
| Acid Blue 93 (dye) | 30 | 30 | 30 | 30 |
| Benzotriazole (corrosion inhibitor) | 0 | 0.3 | 0.3 | 0. |
| Totals | 100 | 100 | 100 | 100 |
| Physical Properties CarrieMed visc. (2 cm/.25° plate) |  |  |  |  |
| shear rate/viscosity (cp) | 132/5800 | 155/5500 | 140/1000 | 200/3600 |
| shear rate/viscosity (cp) | 980/2485 | 1000/2400 | 1000/750 | 1000/2400 |
| shear rate/viscosity (cp) | 4000/2050 | 4000/1950 | 4000/590 | 4000/2000 |
| pH | 2.63 | 2.54 | 2.01 | 2.03 |

The following Table III discloses ball-pen ink Examples 5–9.

TABLE III

|  | Ex. 5 | Ex. 6 | Ex. 7 | Ex. 8 | Ex. 9 |
|---|---|---|---|---|---|
| Component |  |  |  |  |  |
| Water | 19.2 | 0 | 18.5 | 14 | 15 |
| Glycerol | 45 | 0 | 42.7 | 35.2 | 44.2 |
| Dow 65 | 0.5 | 0 | 0.5 | 0.5 | 0.5 |
| 75% Phosphoric Acid | 5 | 0 | 4.75 | 5 | 0 |
| Citric Acid | 0 | 5 | 4.75 | 15 | 10 |

TABLE III-continued

|  | Ex. 5 | Ex. 6 | Ex. 7 | Ex. 8 | Ex. 9 |
|---|---|---|---|---|---|
| Example 5 | 0 | 95 | 0 | 0 | 0 |
| Acid Blue 93 Dye | 30 | 0 | 28.5 | 30 | 30 |
| Benzotriazole | 0.3 | 0 | 0.3 | 0.3 | 0.3 |
| Totals | 100 | 100 | 100 | 100 | 100 |
| Physical Properties CarrieMed visc (2 cm/0.25° plate) | | | | | |
| shear rate/ viscosity (cp) | 400/400 | 480/800 | 412/260 | 426/2752 | 267/1070 |
| shear rate/ viscosity (cp) | 900/315 | 1068/535 | 1014/262 | 1028/2642 | 1027/833 |
| shear rate/ viscosity (cp) | 4000/245 | 4071/464 | 2790/225 | 4023/2182 | 1881/806 |

Referring to Tables II and III, it will be noted that all Examples have a relatively low water content, preferably ranging from about 10 to about 20%. The low water content reduces the cost of the disclosed inks as an additional resin thickener for viscosity purposes is not required. Substantial viscosity is provided by the relatively high glycerol content which is preferably provided in an amount at least as great as the water content and, more preferably, in a ratio of glycerol:water ranging from about 1:1 to 3:1 or greater than 3:1. A glycerol:water ratio substantially exceeding a ratio of 3:1 and approaching 4:1 would provide a viscosity in excess of that required (ball-pen inks generally require a viscosity ranging from about 2 Kcp to about 5 Kcp) and would limit the solubility of the eradicable dye.

The eradicable dye can be present in an amount greater than 20% with about 30 wt % being the preferred eradicable dye content. All of the eradicable dye is not "in solution" in these disclosed inks. Rather, a portion of the eradicable dye is in solution and the remaining portions of the eradicable dye are "in suspension." The high dye content also contributes to the relatively high viscosity required for such ball pen inks.

While the Examples disclose the use of citric acid and phosphoric acid, a number of different acids can be utilized. Specifically, both organic or mineral acids, are applicable in this application. The acids can be monobasic, di-basic, tri-basic, tetra-basic, and so on. The primary acid can also contain substituents as well as unsaturation in the substituents.

Examples of monobasic organic acids include, but are not limited to, benzoic acid, lactic acid, acetic acid, propanoic acid, acetoacetic acid, crotonic acid, formic acid, glycerlic acid, glycollic acid, glyoxylic acid, lactic acid, pyruvic acid, and so on. Examples of dibasic organic acids include, but are not limited to, trans-aconitic acid, fumaric acid, maleic acid, malic acid, tartaric acid, acetylenedicarboxylic acid, tetrahydrophthalic acid, mesaconic acid, phthalic acid, isophthalic acid, terephthalic acid, Itaconic acid, trans-ethyleneoxidedicarboxylic acid, succinic acid, adipic acid, pimellic acid, suberic acid and azelic acid.

Examples of tribasic organic acids include, but are not limited to, substituted phosphoric acid, substituted phosphorous, citric acid, hemimellitic acid, trimellitic, trimesic acid, 2-carboxyethyliminodiacetic acid and nitrilotriacetic acid.

Examples of tetra-basic organic acids include, but are not limited to, phosphonic acid and its various substituted forms, mellophanic acid, prehnitic acid, pyromellitic acid, 2-phosphonoethyliminodiacetic acid, diethylenetetraacetic acids and its other forms.

Acids with higher basicity (five and beyond) are theoretically feasible for this application, but their effectiveness will be greatly dependent on solubility.

Mineral acids can also be used. Monobasic mineral acids include, but are not limited to, hydrochloric acid, hydrobromic acid, hydroiodic acid, hydrofluoric acid, nitric acid, and so on. Dibasic mineral acids include, but are not limited to, sulfuric acid, carbonic acid, chromic acid and so on. Tribasic mineral acids include, but are not limited to, phosphoric acid, phosphorous acid and so on. Tetrabasic mineral acids include, but are not limited to, phosphonic acid.

Benzotriazole is a corrosion inhibitor which is preferably used to protect the ball-pen tip using the disclosed inks even though their acidity is moderate (pH ranging from 2 to 3). Dow 65 is a defoamer commonly used in the ink industry.

The viscosity measurements set forth in Tables II and III are carried out on a CarrieMed Rheometer utilizing a 2 cm 0.25° plate. The viscosities where measured at varying shear rates ranging from 132 to a maximum of 4,000. The measured viscosity at the differing shear rates shown range from greater than 0.2 Kcp to almost 6 Kcp. Examples 1, 2, 4 and 8 are preferred embodiments due to their satisfactory viscosities as shown in Tables II and III.

Additional components include one or more glycols such as ethylene glycol and/or propylene glycol and a non-resinous thickener such as a gum (e.g. xanthan gum or PVP as a thickening or coating additive).

Thus, applicant has surprisingly found that an organic solvent-free, resin-free ball-pen ink can be produced that is both eradicable and that can be used as a re-write ink. The moderate pH enables a minimal amount of corrosion inhibiting materials to be used without damaging the structure of a ball-pen dispensing tip. Manipulation of the eradicable dye is not required and therefore the inks are easy to prepare using conventional batch mixing equipment.

The foregoing description is given for clearness of understanding only, and no unnecessary limitations should be understood therefrom, as modifications within the scope of the invention may be apparent to those having ordinary skill in the art. Throughout the specification, where compositions are described as including components or materials, it is contemplated that the compositions can also consist essentially of, or consists of, any combination of the recited components or materials, unless stated otherwise.

What is claimed is:

1. An eradicable ball pen ink comprising:
   water,
   a polyol,
   an acid,
   an eradicable dye in an amount greater than 20 weight percent (wt. %),
   wherein the ink is free of non-polar organic solvents and has a ratio of polyol to water that is greater than 1.

2. The ink of claim 1 wherein the polyol is selected from the group consisting of glycols, glycol diethers, glycol ethers, glycol acetates, and mixtures thereof.

3. The ink of claim 2 wherein the glycol is glycerol.

4. The ink of claim 1 wherein the polyol comprises glycerol and one or more additional glycols.

5. The ink of claim 1 wherein the ink has a pH of less than 3.

6. The ink of claim 1 wherein the ink has a viscosity of greater than 2 Kcp and a pH of less than about 3.

7. The ink of claim 1 wherein the ink has a viscosity ranging from about 2 Kcp to about 6 Kcp and a pH ranging from about 2 to about 3.

8. The ink of claim 1 wherein the dye is selected from the group consisting of Auramine O, Basic Yellow 2, Basic Yellow 11, Basic Yellow 13, Basic Yellow 21, Basic Yellow 28, Basic Yellow 29, Basic Yellow 40, Basic Yellow 49, Acid Blue 22, Acid Blue 83, Acid Blue 93, Acid Fuchsin, Acid Green 3, Acid Green 5, Acid Green 9, Acid Magenta, Acid Orange 10, Acid Roseine, Acid Rubin, Acid Violet 17, Acid Violet 19, Acid Violet 49, Alizarol Cyanin R, Aluminon, Aniline Blue Ws, Basic Blue 8, Basic Blue 15, Basic Blue 20, Basic Blue 26, Basic Fuchsin, Basic Green 4, Basic Orange 21, Basic Red 9, Basic Red 14, Basic Red 15, Basic Red 29, Basic Red 46, Basic Violet 2, Basic Violet 3, Basic Violet 4, Basic Violet 14, Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta Ii, Magenta Iii, Malachite Green, Methyl Blue, Methyl Green, Methyl Violet, Methyl Violet 2b, Methyl Violet 10b, Mordant Blue 3, Mordant Violet 39, New Fuchsin, Night Blue, Pararosanilin, Primula, Rosanilin, Solochrome Cyanin R, Victoria Blue 4r, Victoria Blue B, Victoria Green B, Water Blue I, and combinations thereof.

9. The ink of claim 1 wherein the acid is selected from the group consisting of citric acid, phosphoric acid, benzoic acid, lactic acid, acetic acid, propanoic acid, acetoacetic acid, crotonic acid, formic acid, glycerlic acid, glycollic acid, glyoxylic acid, lactic acid, pyruvic acid, trans-aconitic acid, fumaric acid, maleic acid, malic acid, tartaric acid, acetylenedicarboxylic acid, tetrahydrophthalic acid, mesaconic acid, phthalic acid, isophthalic acid, terephthalic acid, itaconic acid, trans-ethyleneoxidedicarboxylic acid, succinic acid, adipic acid, pimellic acid, suberic acid, azelic acid, substituted phosphoric acid, citric acid, hemimellitic acid, trimellitic, trimesic acid, 2-carboxyethyliminodiacetic acid, nitrilotriacetic acid, phosphonic acid, mellophanic acid, prehnitic acid, pyromellitic acid, 2-phosphonoethyliminodiacetic acid, diethylenetetraacetic acid, hydrochloric acid, hydrobromic acid, hydroiodic acid, hydrofluoric acid, nitric acid, sulfuric acid, carbonic acid, chromic acid, phosphorous acid, phosphonic acid, and combinations thereof.

10. The ink of claim 1 wherein water is present in an amount ranging from about 10 to about 20 wt. % and the polyol is present in an amount ranging from about 30 to about 50 wt. %.

11. The ink of claim 1 wherein the acid is present in an amount of less than 20 wt. %.

12. The ink of claim 1 wherein the ink is free of resin.

13. The ink of claim 1 further comprising ethylene glycol, propylene glycol, or a mixture of ethylene and propylene glycols.

14. The ink of claim 13 further comprising xanthan gum.

15. An eradicable ball pen ink comprising:
    water,
    a polyol,
    an acid,
    an eradicable dye in an amount greater than 20 weight percent (wt. %),
    wherein the ink is free of non-polar organic solvents.

16. The ink of claim 15 wherein the polyol is selected from the group consisting of glycols, glycol diethers, glycol ethers, glycol acetates, and mixtures thereof.

17. The ink of claim 16 wherein the glycol is glycerol.

18. The ink of claim 15 wherein the polyol comprises glycerol and one or more additional glycols.

19. The ink of claim 15 wherein the amount of polyol is greater than the amount of water.

20. The ink of claim 15 wherein the ink has a pH of less than 3.

21. The ink of claim 15 wherein the ink has a viscosity of greater than 2 Kcp and a pH of less than about 3.

22. The ink of claim 15 wherein the ink has a viscosity ranging from about 2 Kcp to about 3 Kcp and a pH ranging from about 2 to about 3.

23. The ink of claim 15 wherein the dye is selected from the group consisting of Auramine O, Basic Yellow 2, Basic Yellow 11, Basic Yellow 13, Basic Yellow 21, Basic Yellow 28, Basic Yellow 29, Basic Yellow 40, Basic Yellow 49, Acid Blue 22, Acid Blue 83, Acid Blue 93, Acid Fuchsin, Acid Green 3, Acid Green 5, Acid Green 9, Acid Magenta, Acid Orange 10, Acid Roseine, Acid Rubin, Acid Violet 17, Acid Violet 19, Acid Violet 49, Alizarol Cyanin R, Aluminon, Aniline Blue Ws, Basic Blue 8, Basic Blue 15, Basic Blue 20, Basic Blue 26, Basic Fuchsin, Basic Green 4, Basic Orange 21, Basic Red 9, Basic Red 14, Basic Red 15, Basic Red 29, Basic Red 46, Basic Violet 2, Basic Violet 3, Basic Violet 4, Basic Violet 14, Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta Ii, Magenta Iii, Malachite Green, Methyl Blue, Methyl Green, Methyl Violet, Methyl Violet 2b, Methyl Violet 10b, Mordant Blue 3, Mordant Violet 39, New Fuchsin, Night Blue, Pararosanilin, Primula, Rosanilin, Solochrome Cyanin R, Victoria Blue 4r, Victoria Blue B, Victoria Green B, Water Blue I, and combinations thereof.

24. The ink of claim 15 wherein the acid is selected from the group consisting of citric acid, phosphoric acid, benzoic acid, lactic acid, acetic acid, propanoic acid, acetoacetic acid, crotonic acid, formic acid, glycerlic acid, glycollic acid, glyoxylic acid, lactic acid, pyruvic acid, trans-aconitic acid, fumaric acid, maleic acid, malic acid, tartaric acid, acetylenedicarboxylic acid, tetrahydrophthalic acid, mesaconic acid, phthalic acid, isophthalic acid, terephthalic acid, itaconic acid, trans-ethyleneoxidedicarboxylic acid, succinic acid, adipic acid, pimellic acid, suberic acid, azelic acid, substituted phosphoric acid, citric acid, hemimellitic acid, trimellitic, trimesic acid, 2-carboxyethyliminodiacetic acid, nitrilotriacetic acid, phosphonic acid, mellophanic acid, prehnitic acid, pyromellitic acid, 2-phosphonoethyliminodiacetic acid, diethylenetetraacetic acid, hydrochloric acid, hydrobromic acid, hydroiodic acid, hydrofluoric acid, nitric acid, sulfuric acid, carbonic acid, chromic acid, phosphorous acid, phosphonic acid, and combinations thereof.

25. The ink of claim 15 wherein water is present in an amount ranging from about 10 to about 20 wt. % and the polyol is present in an amount ranging from about 30 to about 50 wt. %.

26. The ink of claim 15 wherein the acid is present in an amount of less than 20 wt. %.

27. The ink of claim 15 further comprising ethylene glycol, propylene glycol or a mixture of ethylene and propylene glycols.

28. The ink of claim 27 further comprising xanthan gum.

29. An eradicable ball pen ink comprising:
water,
a polyol,
an acid,
an eradicable dye in an amount greater than 20 weight percent (wt. %),
wherein the ink is free of non-polar organic solvents, and has a ratio of polyol to water that is greater than 2:1.

30. The ink of claim 29 wherein the ink has a pH of less than 3.

31. The ink of claim 29 wherein the ink has a viscosity of greater than 2 Kcp and a pH of less than about 3.

32. The ink of claim 29 wherein the ink has a viscosity ranging from about 2 Kcp to about 6 Kcp and a pH ranging from about 2 to about 3.

33. The ink of claim 29 wherein the dye is selected from the group consisting of Auramine O, Basic Yellow 2, Basic Yellow 11, Basic Yellow 13, Basic Yellow 21, Basic Yellow 28, Basic Yellow 29, Basic Yellow 40, Basic Yellow 49, Acid Blue 22, Acid Blue 83, Acid Blue 93, Acid Fuchsin, Acid Green 3, Acid Green 5, Acid Green 9, Acid Magenta, Acid Orange 10, Acid Roseine, Acid Rubin, Acid Violet 17, Acid Violet 19, Acid Violet 49, Alizarol Cyanin R, Aluminon, Aniline Blue Ws, Basic Blue 8, Basic Blue 15, Basic Blue 20, Basic Blue 26, Basic Fuchsin, Basic Green 4, Basic Orange 21, Basic Red 9, Basic Red 14, Basic Red 15, Basic Red 29, Basic Red 46, Basic Violet 2, Basic Violet 3, Basic Violet 4, Basic Violet 14, Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta Ii, Magenta Iii, Malachite Green, Methyl Blue, Methyl Green, Methyl Violet, Methyl Violet 2b, Methyl Violet 10b, Mordant Blue 3, Mordant Violet 39, New Fuchsin, Night Blue, Pararosanilin, Primula, Rosanilin, Solochrome Cyanin R, Victoria Blue 4r, Victoria Blue B, Victoria Green B, Water Blue I, and combinations thereof.

34. The ink of claim 29 wherein the acid is selected from the group consisting of citric acid, phosphoric acid, benzoic acid, lactic acid, acetic acid, propanoic acid, acetoacetic acid, crotonic acid, formic acid, glycerlic acid, glycollic acid, glyoxylic acid, lactic acid, pyruvic acid, trans-aconitic acid, fumaric acid, maleic acid, malic acid, tartaric acid, acetylenedicarboxylic acid, tetrahydrophthalic acid, mesaconic acid, phthalic acid, isophthalic acid, terephthalic acid, itaconic acid, trans-ethyleneoxidedicarboxylic acid, succinic acid, adipic acid, pimellic acid, suberic acid, azelic acid, substituted phosphoric acid, citric acid, hemimellitic acid, trimellitic, trimesic acid, 2-carboxyethyliminodiacetic acid, nitrilotriacetic acid, phosphonic acid, mellophanic acid, prehnitic acid, pyromellitic acid, 2-phosphonoethyliminodiacetic acid, diethylenetetraacetic acid, hydrochloric acid, hydrobromic acid, hydroiodic acid, hydrofluoric acid, nitric acid, sulfuric acid, carbonic acid, chromic acid, phosphorous acid, phosphonic acids, and combinations thereof.

35. The ink of claim 29 wherein water is present in an amount ranging from about 10 to about 20 wt. % and the polyol is present in an amount ranging from about 30 to about 50 wt. %.

36. The ink of claim 29 wherein the acid is present in an amount of less than 20 wt. %.

37. The ink of claim 29 further comprising at least one glycol selected from ethylene glycol, propylene glycol, and mixtures thereof.

38. A tinted fluid comprising:
water,
a polyol,
an acid,
an eradicable dye in an amount greater than 20 weight percent (wt. %),
wherein the fluid is free of non-polar organic solvents and has a ratio of polyol to water that is greater than 1.

39. The fluid of claim 38 wherein the fluid has a pH of less than 3.

40. The fluid of claim 38 wherein the fluid has a viscosity of greater than 2 Kcp and a pH of less than 3.

41. The fluid of claim 32 wherein the eradicable dye is selected from the group consisting of Auramine O, Basic Yellow 2, Basic Yellow 11, Basic Yellow 13, Basic Yellow 21, Basic Yellow 28, Basic Yellow 29, Basic Yellow 40, Basic Yellow 49, Acid Blue 22, Acid Blue 83, Acid Blue 93, Acid Fuchsin, Acid Green 3, Acid Green 5, Acid Green 9, Acid Magenta, Acid Orange 10, Acid Roseine, Acid Rubin, Acid Violet 17, Acid Violet 19, Acid Violet 49, Alizarol Cyanin R, Aluminon, Aniline Blue Ws, Basic Blue 8, Basic Blue 15, Basic Blue 20, Basic Blue 26, Basic Fuchsin, Basic Green 4, Basic Orange 21, Basic Red 9, Basic Red 14, Basic Red 15, Basic Red 29, Basic Red 46, Basic Violet 2, Basic Violet 3, Basic Violet 4, Basic Violet 14, Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta Ii, Magenta Iii, Malachite Green, Methyl Blue, Methyl Green, Methyl Violet, Methyl Violet 2b, Methyl Violet 10b, Mordant Blue 3, Mordant Violet 39, New Fuchsin, Night Blue, Pararosanilin, Primula, Rosanilin, Solochrome Cyanin R, Victoria Blue 4r, Victoria Blue B, Victoria Green B, Water Blue I, and combinations thereof.

42. The fluid of claim 38 wherein the acid is selected from the group consisting of citric acid, phosphoric acid, benzoic acid, lactic acid, acetic acid, propanoic acid, acetoacetic acid, crotonic acid, formic acid, glycerlic acid, glycollic acid, glyoxylic acid, lactic acid, pyruvic acid, trans-aconitic acid, fumaric acid, maleic acid, malic acid, tartaric acid, acetylenedicarboxylic acid, tetrahydrophthalic acid, mesaconic acid, phthalic acid, isophthalic acid, terephthalic acid, itaconic acid, trans-ethyleneoxidedicarboxylic acid, succinic acid, adipic acid, pimellic acid, suberic acid, azelic acid, substituted phosphoric acid, citric acid, hemimellitic acid, trimellitic, trimesic acid, 2-carboxyethyliminodiacetic acid, nitrilotriacetic acid, phosphonic acid, mellophanic acid, prehnitic acid, pyromellitic acid, 2-phosphonoethyliminodiacetic acid, diethylenetetraacetic acid, hydrochloric acid, hydrobromic acid, hydroiodic acid, hydrofluoric acid, nitric acid, sulfuric acid, carbonic acid, chromic acid, phosphorous acid, phosphonic acid, and combinations thereof.

* * * * *

UNITED STATES PATENT AND TRADEMARK OFFICE
CERTIFICATE OF CORRECTION

PATENT NO.         : 7,163,575 B2
APPLICATION NO. : 10/891810
DATED              : January 16, 2007
INVENTOR(S)       : David Godbout et al.

It is certified that error appears in the above-identified patent and that said Letters Patent is hereby corrected as shown below:

<u>In the Claims:</u>

At Column 13, line 55, "glycerlic acid" should be -- glyceric acid --.

At Column 13, line 55, "glycollic acid" should be -- glycolic acid --.

At Column 13, line 61, "pimellic acid" should be -- pimelic acid --.

At Column 14, line 63, "glycerlic acid" should be -- glyceric acid --.

At Column 14, line 63, "glycollic acid" should be -- glycolic acid --.

At Column 15, line 2, "pimellic acid" should be -- pimelic acid --.

At Column 15, line 63, "glycerlic acid" should be -- glyceric acid --.

At Column 15, line 63, "glycollic acid" should be -- glycolic acid --.

At Column 16, line 2, "pimellic acid" should be -- pimelic acid --.

At Column 16, line 10, "acids, and" should be -- acid, and --.

At Column 16, line 59, "glycerlic acid" should be -- glyceric acid --.

At Column 16, line 59, "glycollic acid" should be -- glycolic acid --.

UNITED STATES PATENT AND TRADEMARK OFFICE
CERTIFICATE OF CORRECTION

PATENT NO.        : 7,163,575 B2
APPLICATION NO.   : 10/891810
DATED             : January 16, 2007
INVENTOR(S)       : David Godbout et al.

It is certified that error appears in the above-identified patent and that said Letters Patent is hereby corrected as shown below:

At Column 16, line 65, "pimellic acid" should be -- pimelic acid --.

Signed and Sealed this

Sixth Day of May, 2008

JON W. DUDAS
*Director of the United States Patent and Trademark Office*